C. BARRETT.
Dumping-Cars.

No. 155,694. Patented Oct. 6, 1874.

WITNESSES
Francis E. Faxon
Waldo E. Boardman

Charles Barrett.
F. Curtis. Atty.

UNITED STATES PATENT OFFICE.

CHARLES BARRETT, OF BOSTON, MASSACHUSETTS.

IMPROVEMENT IN DUMPING-CARS.

Specification forming part of Letters Patent No. 155,694, dated October 6, 1874; application filed August 6, 1874.

*To all whom it may concern:*

Be it known that I, CHARLES BARRETT, of Boston, Suffolk county, Massachusetts, have invented certain Improvements in Dumping-Cars, of which the following is a specification:

These improvements are based upon a class of dumping-cars for which several Letters Patent of the United States have issued to me, noticeably among which are those dated December 19, 1871, and numbered 121,981.

Figure 1:
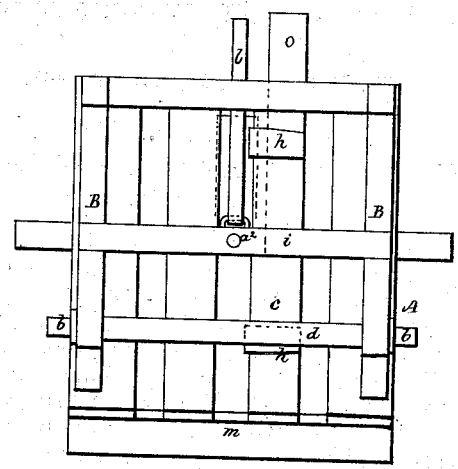
Figure 2:
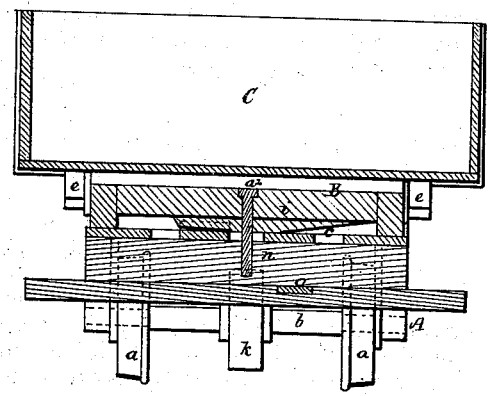
Figure 3:
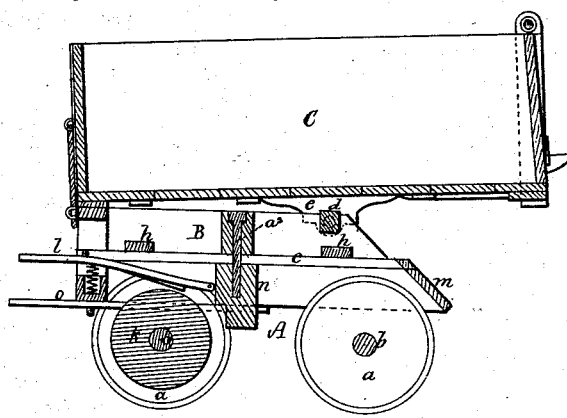

The drawings accompanying this specification represent, in Figure 1, a plan of the frame, in Fig. 2 a cross-section, and in Fig. 3 a longitudinal section, of a car embodying my improvements.

In these drawings, A represents a platform-car, substantially such as is generally in use upon railways, with the exception that it is of much less length, the wheels of such car being shown at $a\ a$, the axles thereof at $b\ b$, and its platform at $c$. B represents an open rectangular frame, of a width and length about equal to that of the platform $c$, and this frame B carries at its forward part a horizontal shaft or bar, $d$, the journals of the latter passing through ears $e\ e$, which depend from the under side or bottom of a rectangular box or hod, C, the shaft and ears serving to support the hod in position upon the frame, and permit it to be tilted into an inclined position, for the purpose of dumping its contents. The frame B is mounted upon the platform $c$ by a central pivot or axis, $a^2$, in order that its position upon such platform may be varied, and enable its load to be dumped at either side or at the forward end of the car; and this pivot $a^2$ should be placed at such a distance in rear of the forward end of the said frame B that the latter shall serve as a stop or abutment, against which the hod, when tilted, may abut, and its angle of inclination thus determined. To counteract the tendency of the car to tip upward at rear by tilting upon the forward axle, and also to obtain a broad bearing for the parts, I bevel or chamfer the front edge of the car-platform, as shown at $m$ in the drawings, which permits the frame B to be placed farther to the rear of said car-platform than would otherwise be possible.

As before stated, this car is adapted to dump its load over forward end or at either side, and for this purpose the frame B is pivoted vertically to the platform; and in order to provide a rigid stop, or series of stops, against which the frame may abut, and by which its position transversely of the car may be determined, I affix to the top of the platform two studs or posts, $h\ h$, these studs being arranged centrally fore and aft the platform, and at equal distances from the pivot $a^2$. These stops $h\ h$ are so arranged with respect to the central bar $i$ of the frame B that, when the latter and the hod which it carries are turned at right angles to the car, for the purpose of placing in position for dumping the load to either side, the said bar $i$ shall bring up against the adjacent stop, and its movement arrested.

In order to provide a simple and efficient brake for cars of this character, I affix to the center of the rear axle a friction roller or hub, $k$, and over this roller I place a horizontal pedal or brake-lever, $l$, the forward or inner end of which is pivoted to the central beam $n$ of the platform, while the rear end of such pedal extends to such a distance from the platform as to be readily accessible to the brakeman's foot, the pedal being lifted from the roller by a spring suitably situated. By means of the roller or hub $k$ and brake $l$, arranged as explained, the brakeman is enabled to readily brake up the car, as the friction between the two, consequent upon the pressure of his foot, is quite sufficient for the purpose.

In order to provide a standing-place for the brakeman or other person, which may be occupied temporarily, I dispose beneath the platform of the car, and within suitable guides, a horizontal bar, $o$, which, when needed, may be drawn out to such a distance as to afford good foothold to a person, and which, when not in use, may be pushed inward and concealed from sight.

I have entertained certain modifications of my present car, which consist, first, in adding to the platform side bars or studs, of such length that they shall project some distance beyond the center or sides and one end of the dumping-box, and permit the box, as it is tilted, to strike against them, and remove the strain to a great extent from the pivot of the frame.

A second modification relates to the brake hereinbefore explained. As herein shown, it cannot be used with perfect safety when a car is running backward, owing to the danger to the brakeman, who is thus riding in front of the car. To remedy this I employ a cross-bar, fastened at about its center to the brake-lever $l$, and with its ends projecting beyond the sides of the platform, which will enable a brakeman to operate the brake from the sides of the car, and pins or anti-friction rollers may be applied to the under side of the platform, if desirable, to form bearings for such cross-bar. A pulley can be applied to the forward axle as well as to the rear, and the brake adapted to act upon both, if necessary.

I claim—

1. The stops $h\ h$, in combination with the platform $c$ and frame B, substantially as and for the purposes stated.

2. The brake consisting of the hub $k$ and pedal $l$, substantially as and for the purposes stated.

CHARLES BARRETT.

Witnesses:
F. CURTIS,
W. E. BOARDMAN.